(12) United States Patent
Lim et al.

(10) Patent No.: US 9,057,897 B2
(45) Date of Patent: Jun. 16, 2015

(54) LIQUID CRYSTAL DISPLAY DEVICES AND METHODS OF MANUFACTURING LIQUID CRYSTAL DISPLAY DEVICES

(71) Applicant: SAMSUNG DISPLAY CO., LTD., Yongin-si, Gyeonggi-Do (KR)

(72) Inventors: Jae-Ik Lim, Yongin-si (KR); Jae-Hyun Kim, Yongin-si (KR); Gee-Bum Kim, Yongin-si (KR); Yong-Seok Yeo, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 173 days.

(21) Appl. No.: 13/748,512

(22) Filed: Jan. 23, 2013

(65) Prior Publication Data

US 2013/0342772 A1    Dec. 26, 2013

(30) Foreign Application Priority Data

Jun. 20, 2012    (KR) .............................. 2012-0066227

(51) Int. Cl.
| | | |
|---|---|---|
| G02F 1/1333 | (2006.01) | |
| G02F 1/133 | (2006.01) | |
| G02F 1/13 | (2006.01) | |
| G02F 1/1334 | (2006.01) | |
| G02F 1/1337 | (2006.01) | |

(52) U.S. Cl.
CPC .......... *G02F 1/13306* (2013.01); *G02F 1/1303* (2013.01); *G02F 1/1334* (2013.01); *G02F 1/133784* (2013.01); *G02F 2001/13345* (2013.01); *G02F 2001/13347* (2013.01)

(58) Field of Classification Search
CPC ........................... G02F 1/1334; G02F 1/13036
USPC ............... 349/88, 182, 183; 252/299.01, 582, 252/299.6
See application file for complete search history.

(56) References Cited

U.S. PATENT DOCUMENTS

| | | | |
|---|---|---|---|
| 5,469,278 A * | 11/1995 | Takahara et al. ................. 349/86 |
| 6,540,938 B1* | 4/2003 | Afzali-Arkadani et al. ........................ 252/299.01 |
| 6,690,440 B1* | 2/2004 | Tanaka et al. .................. 349/129 |
| 7,812,834 B2 | 10/2010 | Kim |
| 2004/0160538 A1* | 8/2004 | Li et al. ............................ 349/16 |
| 2005/0225704 A1* | 10/2005 | Tashiro et al. ................. 349/113 |
| 2005/0248697 A1* | 11/2005 | Ukawa ............................ 349/98 |
| 2006/0001817 A1* | 1/2006 | Yamazaki et al. ............. 349/141 |
| 2008/0142827 A1 | 6/2008 | Choi et al. |
| 2008/0305280 A1* | 12/2008 | Harada et al. ................... 428/1.2 |
| 2008/0316395 A1* | 12/2008 | O'Keeffe ......................... 349/88 |
| 2012/0135661 A1* | 5/2012 | Imanishi et al. ................ 445/24 |

FOREIGN PATENT DOCUMENTS

| | | |
|---|---|---|
| JP | 2008-152221 | 7/2008 |
| KR | 1020000020856 A | 4/2000 |
| KR | 1020060114453 A | 11/2006 |

* cited by examiner

*Primary Examiner* — Sang V Nguyen
(74) *Attorney, Agent, or Firm* — Christie, Parker & Hale, LLP

(57) ABSTRACT

A liquid crystal display device includes a first substrate, a first electrode on the first substrate, a second substrate facing the first substrate, a second electrode on the second substrate facing the first electrode, and a liquid crystal structure between the first electrode and the second electrode. The liquid crystal structure includes a polymer network and liquid crystal molecules. The liquid crystal display device operates in a transmissive mode when an electric field is not generated between the first and the second electrodes, and operates in a scattering mode when the electric field is generated between the first and the second electrodes.

16 Claims, 6 Drawing Sheets

LIQUID CRYSTAL DISPLAY DEVICES AND METHODS OF MANUFACTURING LIQUID CRYSTAL DISPLAY DEVICES

CROSS REFERENCE TO RELATED APPLICATION

This application claims priority to and the benefit of Korean Patent Application No. 2012-0066227 filed in the Korean Intellectual Property Office on Jun. 20, 2012, the entire contents of which are incorporated herein by reference.

BACKGROUND

1. Technical Field

Embodiments of the invention relate to liquid crystal display devices and methods of manufacturing liquid crystal display devices.

2. Description of the Related Art

A liquid crystal display device may display images based on various electrical signals applied to an electrode utilizing transmittancy variation of liquid crystal molecules. Although the liquid crystal display device usually requires a separate light source, the liquid crystal display device is widely used in various portable devices because the liquid crystal display device has low power consumption and low manufacturing cost.

In twisted nematic (TN) type or a super twisted nematic (STN) type liquid crystal display devices, a liquid crystal layer is generally disposed between two polarization layers, so that light efficiency of the liquid crystal display device may be decreased and brightness of the image may also reduced. Accordingly, a liquid crystal display device may operate in a transmissive mode and a scattering mode using a refractive index difference between liquid crystal molecules and a polymer.

As for conventional liquid crystal display devices operating in the transmissive mode and the scattering mode, the liquid crystal display device operates in the transmissive mode when an electric field is not generated between two electrodes (i.e., off-state), and the liquid crystal display device operates in the scattering mode when an electric field is generated between the two electrodes (i.e., on-state). However, conventional liquid crystal display devices may not allow the use of a smart window of recent display devices, which operates in a transparent mode when voltage is not applied to an electrode (i.e., off-state) and operates in a display mode when voltage is applied to the electrode (i.e., on-state) according to a user's demand.

SUMMARY

Aspects of embodiments of the invention are directed to a liquid crystal display device operating in a transmissive mode when a voltage is not applied to an electrode(s) and operating in a scattering mode when a voltage is applied to the electrode(s).

In some embodiments, a liquid crystal display device includes a first substrate, a first electrode on the first substrate, a second substrate facing the first substrate, a second electrode on the second substrate facing the first electrode, a liquid crystal structure between the first electrode and the second electrode, the liquid crystal structure including a polymer network and liquid crystal molecules. The liquid crystal display device operates in a transmissive mode when an electric field is not generated between the first and the second electrodes, and the liquid crystal display device operates in a scattering mode when an electric field is generated between the first and the second electrodes. The liquid crystal display device may be transparent or substantially transparent when the liquid crystal display device operates in the transmissive mode.

In some embodiments, the liquid crystal molecules are partially or entirely dispersed in the polymer network. The polymer network may be present in a range of about 5 wt % to about 50 wt % based on a total weight of the liquid crystal structure.

The liquid crystal display device may further include a first alignment layer on the first electrode and a second alignment layer on the second electrode. In some embodiments, the liquid crystal display device includes a color filter disposed between the second substrate and the second electrode. In other embodiments, the liquid crystal structure includes a color dye instead of the color filter.

Each of the first and the second alignment layers may not be subjected to a rubbing process.

A refractive index of each liquid crystal molecule in a minor axis may be substantially the same as a refractive index of the polymer network when the liquid crystal display device operates in the transmissive mode. An effective refractive index of each liquid crystal molecule in a minor axis and a major axis may be substantially greater than a refractive index of the polymer network when the liquid crystal display device operates in the scattering mode.

Each of the first and the second alignment layers may be subject to a rubbing process to align the liquid crystal molecules in a direction substantially parallel to the first substrate or the second substrate when the liquid crystal display device operates in the transmissive mode.

The refractive indexes of each liquid crystal molecule in an X direction and a Y direction may be substantially the same as a refractive index of the polymer network when the liquid crystal display device operates in the transmissive mode. An effective refractive index of each liquid crystal molecule in an X direction, a Y direction, and a Z direction may be different from a refractive index of the polymer network when the liquid crystal display device operates in the scattering mode.

Each of the first and the second alignment layers may be subject to a rubbing process to align the liquid crystal molecules in a direction substantially perpendicular to the first substrate or the second substrate when the liquid crystal display device operates in the transmissive mode.

In some embodiments, the liquid crystal display device includes a polarization layer disposed on a bottom of the first substrate, and the first electrode includes a plurality of portions arranged substantially parallel to one another.

A transmissive axis of the polarization layer may be substantially parallel to a minor axis of each liquid crystal molecule, and a refractive index of each liquid crystal molecule in the minor axis may be substantially the same as a refractive index of the polymer network when the liquid crystal display device operates in the transmissive mode. A transmissive axis of the polarization layer may be substantially parallel to a major axis of each liquid crystal molecule, and an effective refractive index of each liquid crystal molecule in the major axis and a minor axis may be different from a refractive index of the polymer network when the liquid crystal display device operates in the scattering mode.

In some embodiments, a method of manufacturing a liquid crystal display device includes forming a first electrode on a first substrate, forming a second electrode on a second substrate, combining the first substrate with the second substrate while opposing the first electrode to the second electrode, and forming a liquid crystal structure including a polymer network and liquid crystal molecules between the first and the second electrodes. The liquid crystal display device operates in a transmissive mode when an electric field is not generated between the first and the second electrodes while the liquid crystal display device operates in a scattering mode when an electric field is generated between the first and the second electrodes. The liquid crystal display device may be transparent or substantially transparent when the liquid crystal display device operates in the transmissive mode.

In some embodiments, forming the liquid crystal structure includes forming a preliminary liquid crystal structure between the first electrode and the second electrode, and performing an exposure process on the preliminary liquid crystal structure. In some embodiments, the method further includes forming a first alignment layer on the first electrode, and forming a second alignment layer on the second electrode. In some embodiments, the method further includes forming a color filter between the second substrate and the second electrode. In some embodiments, the method further includes performing a rubbing process on the first alignment layer and the second alignment layer. In some embodiments, the method further includes forming a polarization layer on a bottom of the first substrate.

BRIEF DESCRIPTION OF THE DRAWINGS

Example embodiments can be understood in more detail from the following description in conjunction with the accompanying drawings, in which.

DESCRIPTION OF EMBODIMENTS

Figure 1:
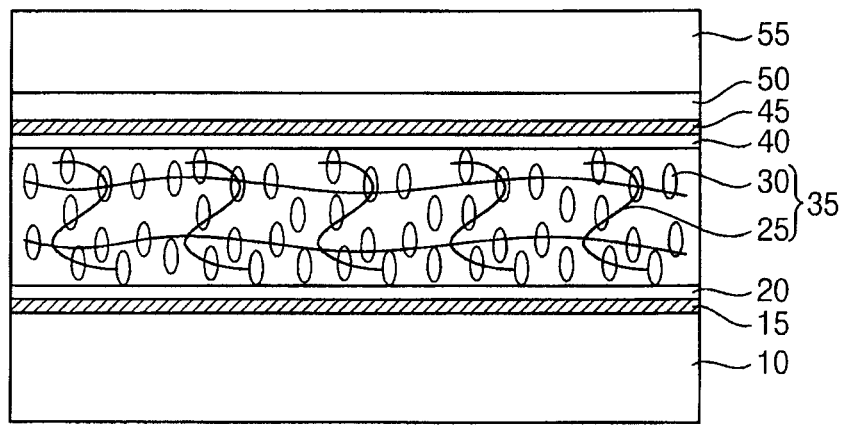
FIG. 1 is a cross-sectional view of a liquid crystal display device operating in a transmissive mode according to example embodiments.

The example embodiments are described more fully hereinafter with reference to the accompanying drawings. The concepts described herein may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to," or "coupled to" another element or layer, it can be directly on, connected to, or coupled to the other element or layer or intervening elements or layers may be present. In contrast, when an element is referred to as being "directly on," "directly connected to," or "directly coupled to" another element or layer, there are no intervening elements or layers present. Like or similar reference numerals refer to like or similar elements throughout. As used herein, the term "and/or" includes any and all combinations of one or more of the associated listed items.

It will be understood that, although the terms first, second, third, etc. may be used herein to describe various elements, components, regions, layers, patterns, and/or sections, these elements, components, regions, layers, patterns, and/or sections should not be limited by these terms. These terms are only used to distinguish one element, component, region, layer pattern, or section from another region, layer, pattern, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross sectional illustrations that are schematic illustrations of illustratively idealized example embodiments (and intermediate structures) of the disclosed concepts. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the disclosed concepts.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
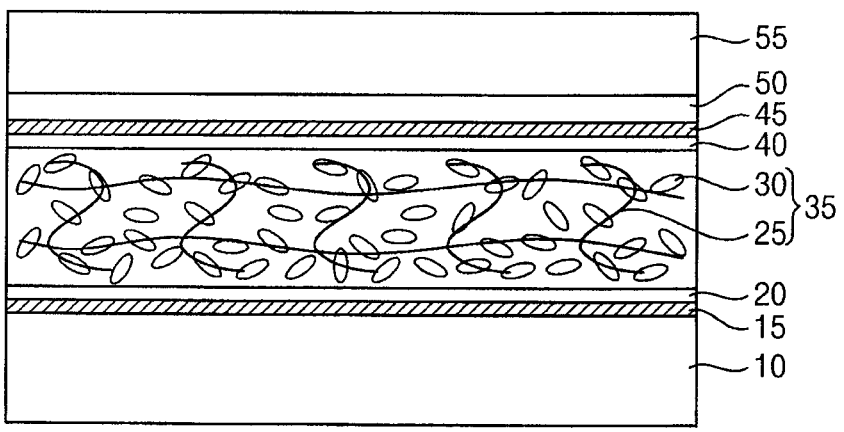
FIG. 2 is a cross-sectional view of a liquid crystal display device operating in a scattering mode according to example embodiments.

FIG. 1 is a cross-sectional view illustrating a liquid crystal display device operating in a transmissive mode according to example embodiments. FIG. 2 is a cross-sectional view illustrating a liquid crystal display device operating in a scattering mode according to example embodiments.

Referring to FIGS. 1 and 2, the liquid crystal display device may include a first substrate 10, a first electrode 15, a first alignment layer 20, a liquid crystal structure 35, a second alignment layer 40, a second electrode 45, a color filter 50, and a second substrate 55. In example embodiments, the liquid crystal structure 35 may include a polymer network 25 and a plurality of liquid crystal molecules 30. The liquid crystal display device may be transparent or substantially transparent when operating in the transmissive mode (i.e., it may act as a clear window when not operating).

The first substrate 10 may include a transparent insulation substrate. For example, the first substrate 10 may include a glass substrate, a quartz substrate, a transparent resin substrate, or the like. Examples of the transparent resin substrate for the first substrate 10 include a polyimide-based resin substrate, an acryl-based resin substrate, a sulfonic acid-based resin substrate, a polyacrylate-based resin substrate, a polyethyleneterephthalate-based resin substrate, a polycarbonate-based resin substrate, a polyether-based resin substrate, or the like. In example embodiments, a first face of the first substrate 10 may substantially correspond to a first face of the second substrate 55 (e.g., the first face of the first substrate 10 may face the first face of the second substrate 55). A second face of the first substrate 10 may be opposite to the first face of the first substrate 10, and a second face of the second substrate 55 may be opposite to a second face of the second substrate 55. Although the first substrate 10 may be substantially parallel to the second substrate 55, the first and the second substrate 10 and 55 may be vertically disposed.

Although it is not illustrated, a lower structure may be provided on the first face of the first substrate 10. Here, the lower structure may include a switching device, a driving circuit, a controller, etc. Additionally, more than one insulation layer may be disposed on the first face of the first substrate 10 to cover the lower structure. Furthermore, a buffer layer may be interposed between the first substrate 10 and the lower structure.

The first electrode 15 may be disposed on the first face of the first substrate 10. The first electrode 15 may be electrically connected to the lower structure. For example, the first electrode 15 may pass through the insulation layer to make contact with the lower structure. Alternatively, an additional contact may be provided through the insulation layer and thus the first electrode 15 may be electrically connected to the lower structure through the contact.

The first electrode 15 may include a transparent conductive material. For example, the first electrode 15 may include zinc oxide (ZnOx), indium tin oxide (ITO), tin oxide (SnOx), indium oxide (InOx), gallium oxide (GaOx), indium zinc oxide (IZO), titanium oxide (TiOx), and/or the like. These may be used alone or in combinations. The first electrode 15 may have a single layer structure or a multi layer structure.

In example embodiments, a first conductive layer (not illustrated) may be formed on the first face of the first substrate 10, and then the first conductive layer may be patterned by the pixel of the liquid crystal display device, thereby forming the first electrode 15 on the first substrate 10. Here, the first conductive layer may be obtained by a sputtering process, a printing process, an atomic layer deposition (ALD) process, a chemical vapor deposition (CVD) process, a pulsed laser deposition (PLD) process, or the like.

The first alignment layer 20 may be disposed on the first electrode 15. The first alignment layer 20 may include a polyimide, a polyamide, a polyamic acid, a polyphenylenephthalamide, a polyethylene, a polystyrene, a polyester, a polyurethane, a polyvinylalcohol, a polyethyleneimine, a polymethylmethacrylate, and/or the like. Additionally, the first alignment layer 20 may be formed by a spin coating process, a printing process, a spray process, or the like. In example embodiments, the first alignment layer 20 may include a material varied in accordance with alignment conditions of the liquid crystal molecules 30 and/or ingredients in the polymer network 25.

Referring now to FIGS. 1 and 2, the color filter 50 may be disposed on the first face of the second substrate 55. The second substrate 55 may include a transparent insulation substrate. For example, the second substrate 55 may include a glass substrate, a quartz substrate, a transparent resin substrate, or the like. The color filter 50 may include a red color filter for emitting a red color of light, a green color filter for emitting a green color of light, or a blue color filter for emitting a blue color of light in accordance with the pixels of the liquid crystal display device.

The second electrode 45 may be positioned on the color filter 50. In example embodiments, the second electrode 45 may substantially fully cover the color filter 50, so that outgassing of organic layer(s) included in the color filter 50 is reduced. Further, the second electrode 45 may prevent the color filter 50 from being deteriorated to thereby reduce burn-in of the image on the liquid crystal display device.

The second electrode 45 may include a transparent conductive material. For example, the second electrode 45 may be formed using indium include zinc oxide (ZnOx), indium tin oxide (ITO), tin oxide (SnOx), indium oxide (InOx), gallium oxide (GaOx), indium zinc oxide (IZO), titanium oxide (TiOx), and/or the like. These may be used alone or in combination. The second electrode 45 may have a single layer structure or a multi-layer structure (in the multi-layer structure, the structure may include more than one transparent conductive material film). Additionally, the second electrode 45 may be formed on the color filter 50 by a sputtering process, a printing process, a chemical vapor deposition process, an atomic layer deposition process, a pulsed laser deposition process, a vacuum evaporation process, or the like.

In example embodiments, a second conductive layer (not illustrated) may be formed on the color filter 50. The second conductive layer may then be patterned by a photolithography process or an etching process using an additional etching mask. Thus, the second electrode 45 may be provided on the color filter 50. Here, the second electrode 45 may be a common electrode substantially shared by adjacent pixels.

The second alignment layer 40 may be disposed on the second electrode 45. The second alignment layer 40 may be formed using a polyimide, a polyamide, a polyamic acid, a polyphenylenephthalamide, a polyethylene, a polystyrene, a polyester, a polyurethane, a polyvinylalcohol, a polyethyleneimine, a polymethylmethacrylate, and/or the like. The second alignment layer 40 may be formed by a spin coating process, a printing process, a spray process, or. In example embodiments, the second alignment layer 40 may also include a material varied in accordance with alignment conditions of the liquid crystal molecules 30 and/or ingredients in the polymer network 25.

As illustrated in FIGS. 1 and 2, the liquid crystal structure 35 may be disposed between the first alignment layer 20 and the second alignment layer 40. The liquid crystal structure 35 may include the polymer network 25 and a plurality of the liquid crystal molecules 30. The liquid crystal molecules 30 may be partially or completely dispersed in the polymer network 25. In other words, the liquid crystal molecules 30 may be partially or entirely trapped by the polymer network 25. That is, at least some of the liquid crystal molecules 30 may be dispersed in the polymer network 30. Further, other liquid crystal molecules 30 may be spaced apart from the polymer network 25. Namely, portions of the liquid crystal molecules 30 may be out of the polymer network 25.

In example embodiments, the polymer network 25 of the liquid crystal structure 35 may be formed using a reactive mesogen (RM), a monomer, a photo-initiator, and the like. For example, the polymer network 25 may be generated from monomeric reactive mesogen, oligomeric reactive mesogen, polymeric reactive mesogen, and/or the like. A content of the polymer network 25 in the liquid crystal structure 35 may be in a range of about 5 percent by weight to about 50 percent by weight based on a total weight of the liquid crystal structure 35. The polymer network 25 may partially or completely prevent floating, moving, and/or revolving of the liquid crystal molecules 30. Further, a major axis of each liquid crystal molecule 30 may be arranged in a direction substantially perpendicular to the first substrate 10 and/or the second substrate 55.

In the formation of the liquid crystal structure 35 according to example embodiments, a preliminary liquid crystal structure (not illustrated) may be disposed or injected in a space between the first alignment layer 20 and the second alignment layer 40. Alternatively, the preliminary liquid crystal structure may be directly formed on the first alignment layer 20 and/or the second alignment layer 40 by a printing process, a spin coating process, a spray process, or the like. The preliminary liquid crystal structure may include vertical alignment type liquid crystal molecules, monomers, photo-initiators, reactive mesogen, and/or the like. Then, an exposure process may be performed on the preliminary liquid crystal structure positioned between the first and the second alignment layers 20 and 40. For example, the preliminary liquid crystal structure may be exposed by an ultraviolet (UV) exposure process.

In the exposure process for forming the liquid crystal structure 35, light such as ultraviolet light may be irradiated on the preliminary liquid crystal structure, and then polymer seeds may be generated in the preliminary liquid crystal structure by the light. The polymer seeds and the monomers may be polymerized to form the polymer network 25 between the first and the second alignment layers 20 and 40. In this case, the liquid crystal molecules 30 may be fully or partially trapped by the polymer network 25. That is, some of the liquid crystal molecules 30 may be partially or entirely dispersed in the polymer network 25 while others of the liquid crystal molecules 30 may be spaced apart form the polymer network 25. As a result, the liquid crystal structure 35 including the polymer network 25 and the liquid crystal molecules 30 may be provided between the first and the second alignment layers 20 and 40.

In some example embodiments, each of the first and the second alignment layers 20 and 40 may not be subject to a rubbing process. As illustrated in FIG. 1, the liquid crystal molecules 30 may be arranged in a direction substantially perpendicular to the first substrate 10 and/or the second substrate 55 because of hydrophobicity of the first alignment layer 20 and/or the second alignment layer 40 when an electric field is not generated between the first and the second electrodes 15 and 45. As the vertical anchoring force of the first alignment layer 20 and/or the second alignment layer 40 increases, the liquid crystal molecules 30 may be easily orientated substantially perpendicular to the first substrate 10 and/or the second substrate 55. In this case, a refractive index ($N_o$) of each liquid crystal molecule 30 in a minor axis may be substantially the same as a refractive index ($N_p$) of the polymer network 25. For example, when the liquid crystal molecules 30 are arranged in the direction substantially perpendicular to the first substrate 10 and/or the second substrate 55 before a voltage is applied to the first electrode 15 and/or the second electrode 35, incident light generated from a light source (not illustrated) may pass through the liquid crystal structure 35 without scattering by the liquid crystal molecules 30 because the refractive index ($N_o$) of each liquid crystal molecule 30 in the minor axis may be substantially the same as the refractive index ($N_p$) of the polymer network 25. Thus, the liquid crystal display device may operate in the transmissive mode when an electric field is not generated between the first electrode 15 and the second electrode 45 because the liquid crystal molecules 30 may be vertically arranged relative to the first substrate 10 and/or the second substrate 55.

As illustrated in FIG. 2, when an electric field is generated between the first and the second electrodes 15 and 45, the liquid crystal display device may operate in the scattering mode. While the electric field is generated between the first and the second electrodes 15 and 45, the liquid crystal molecules 30 may revolve along a direction substantially perpendicular to the electric field. For example, when the electric field between the first and the second electrodes 15 and 45 is substantially perpendicular to a Z axis, optical axes of the liquid crystal molecules 30 may move from the Z axis onto an X-Y plane, and thus an effective refractive index of each liquid crystal molecule 30, which is the sum of a refractive indexes ($N_o$) in the minor axis and a refractive index ($N_e$) in a major direction, may be substantially larger than the refractive index ($N_p$) of the polymer network 25. This, the effective refractive indexes of the liquid crystal molecules 30 may be different from the refractive index ($N_p$) of the polymer network 25, so that the incident light may be scattered and reflected by the liquid crystal molecules 30 in the liquid crystal structure 35. Therefore, the liquid crystal display device may operate in the scattering mode when a voltage is applied to the first electrode 15 and/or a second electrode 45.

As described above, the liquid crystal display device according to example embodiments may operate in the transmissive mode when the voltage is not applied to the first electrode 15 and/or the second electrode 45 (i.e., off-state), whereas it may operate in the scattering mode when the voltage is applied to the first electrode 15 and/or the second electrode 45 (i.e., on-state). Therefore, the liquid crystal display device may be employed in a display apparatus requiring a transparent window, and the power consumption of the liquid crystal display device may be reduced because the power may be applied to the liquid crystal display device according to a user's demands. Additionally, the liquid crystal display device may have a transparency substantially higher than that of the conventional display device because the liquid crystal display device may operate in the transparent mode in an initial state. Furthermore, the rubbing process may not be performed on the first alignment layer 20 and/or the second alignment layer 40, and therefore, the liquid crystal molecules 30 may randomly tilt in arbitrary directions when the electric field is generated between the first and the second electrodes 15 and 45. Hence, the liquid crystal display device may have a substantially uniform scattering degree of incident light along all directions. Meanwhile, the movement or flowing of the liquid crystal molecules 30 may be partially or wholly restricted by the polymer network 25, and thus the liquid crystal display device may not require an additional separating member such as a partition.

Although the liquid crystal display device having a vertical alignment mode is illustrated in FIGS. 1 and 2, the liquid crystal display device may have various other modes such as an in plane switching (IPS) mode, a fringe field switching (FFS) mode, a twisted nematic (TN) mode, an electrically controlled birefringence (EBC) mode, etc.

Figure 3:
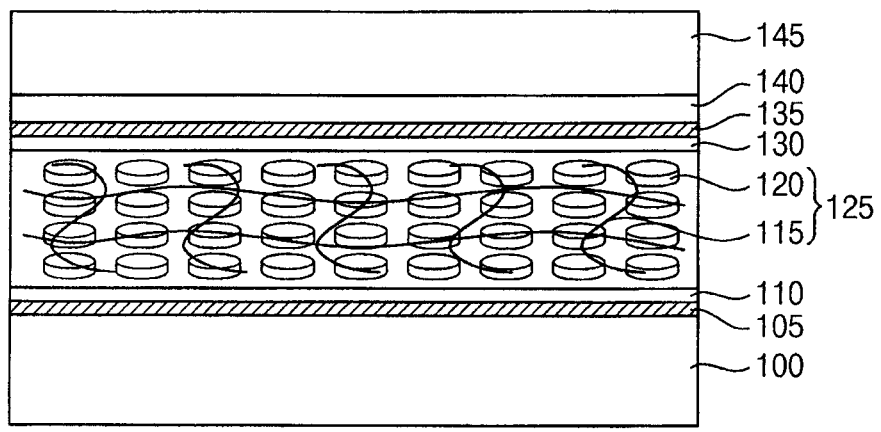
FIG. 3 is a cross-sectional view of a liquid crystal display device operating in a transmissive mode according to some example embodiments.
Figure 4:
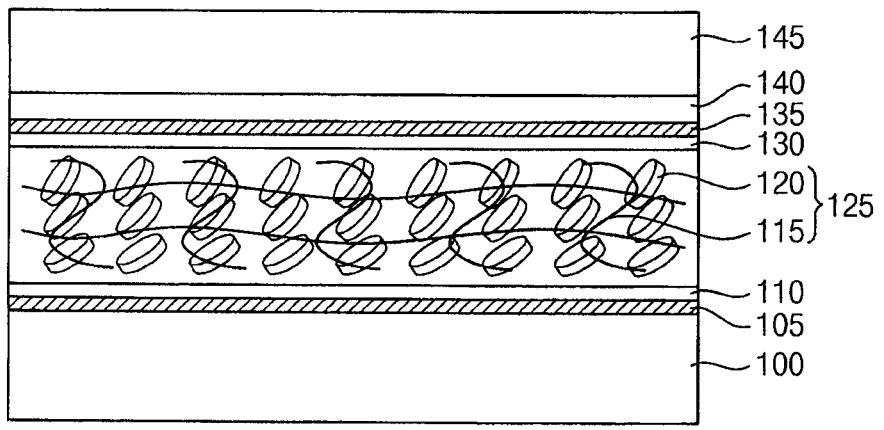
FIG. 4 is a cross-sectional view of a liquid crystal display device operating in a scattering mode according to some example embodiments.

FIG. 3 is a cross-sectional view illustrating a liquid crystal display device operating in a transmissive mode according to some example embodiments. FIG. 4 is a cross-sectional view illustrating a liquid crystal display device operating in a scattering mode according to some example embodiments. The liquid crystal display device illustrated in FIGS. 3 and 4 may have a configuration substantially the same as or substantially similar to that of the liquid crystal display device described with reference to FIGS. 1 and 2 except that of the liquid crystal molecules 120.

Referring to FIGS. 3 and 4, the liquid crystal display device may include a first substrate 100, a first electrode 105, a first alignment layer 110, a liquid crystal structure 125, a second alignment layer 130, a second electrode 135, a color filter 140, a second substrate 145, and the like. The liquid crystal structure 125 may include a polymer network 115 and a plurality of liquid crystal molecules 120.

Each of the first and the second substrates 100 and 145 may include a transparent insulation substrate. For example, each of the first and the second substrates 100 and 145 may include a glass substrate, a quartz substrate, a transparent resin substrate, or the like. Although it is not illustrated, a lower structure having switching devices and driving circuits may be provided on the first substrate 100, and at least one insulation layer covering the lower structure may be formed on the first substrate 100.

The first electrode 105 may be disposed on the first substrate 100, and may make electrical contact with the lower structure. The first electrode 105 may include a transparent conductive material, and may have a single layer structure or a multi layer structure, which includes more than one transparent conductive film. The first electrode 105 may be obtained by processes substantially the same as or substantially similar to those of forming the first electrode 15 described with reference to FIG. 1.

The first alignment layer 110 may be disposed on the first electrode 105. In example embodiments, a rubbing process may be performed on the first alignment layer 110, so that the liquid crystal molecules 120 may be arranged in a direction substantially parallel to the first substrate 100 when a voltage is not applied to the first electrode 105 and/or the second electrode 135.

As illustrated in FIGS. 3 and 4, the color filter 140 may be disposed on the second substrate 145. Here, the color filter 140 may include a red color filter, a green color filter, and/or a blue color filter in accordance with pixels of the liquid crystal display device. In some example embodiments, the liquid crystal structure 125 may include a color dye such as a red color dye, a blue color dye, and/or a green color dye. When a dye is included in the liquid crystal structure 125, the color filter 140 may be omitted.

The second electrode 135 may be positioned on the color filter 140. The second electrode 135 may substantially fully cover the color filter 140. The second electrode 135 may also include a transparent conductive material similar to that of the first electrode 105. Further, the second electrode 135 may have a single layer structure or a multi-layer structure. The second electrode 135 may be formed by a processes substantially the same as or substantially similar to the processes of forming the second electrode 45 described with reference to FIG. 1. In example embodiments, each of the first and the second electrodes 105 and 135 may include the same material. Alternatively, the second electrode 135 may include a material different from that of the first electrode 105.

The second alignment layer 130 may be disposed on the second electrode 135. In example embodiments, the second alignment layer 130 may also be subject to a rubbing process. Thus, as a result of the rubbing process performed on the second alignment layer 130, the liquid crystal molecules 120 may be oriented in a direction substantially parallel to the second substrate 145 when an electric field is not generated between the first electrode 105 and the second electrode 135. That is, the first and the second alignment layers 110 and 130 may enable the liquid crystal molecules 120 to be arranged in the direction substantially parallel to the first substrate 100 and/or the second substrate 145 when voltage is not applied to the first electrode 105 and/or the second electrode 135.

The liquid crystal structure 125 may be disposed between the first and the second alignment layers 110 and 130. The liquid crystal structure 125 may include the polymer network 115 and the plurality of liquid crystal molecules 120 partially or wholly dispersed in the polymer network 115. In other words, at least some of the liquid crystal molecules 120 may be partially or entirely trapped in the polymer network 115. Further, some of the liquid crystal molecules 120 may be separated from the polymer network 115 by predetermined or set intervals. In example embodiments, the polymer network 115 may be generated from a reactive mesogen (RM), a monomer, a photo-initiator, and the like. The liquid crystal structure 125 may be obtained by processes substantially the same as or substantially similar to the processes of forming the liquid crystal structure 35 described with reference to FIG. 1.

In example embodiments, the liquid crystal molecules 120 may include negative-C (Nega-C) type liquid crystal molecules. Each of the negative-C type liquid crystal molecules may have a refractive index ($N_e$) in a Z axis and a refractive index ($N_o$) in an X axis and a Y axis. Here, the refractive index ($N_e$) in the Z axis may be substantially different from the refractive index ($N_o$) in the X and the Y axes. For example, the refractive index ($N_o$) in the X and the Y axes may be substantially larger than the refractive index ($N_e$) in the Z axis.

As illustrated in FIG. 3, when the voltage is not applied to the first electrode 105 and/or the second electrode 135 (i.e., off-state), each liquid crystal molecule 120 may have the refractive index ($N_o$) in the X and the Y axes, such that the refractive index ($N_o$) of each liquid crystal molecule 120 may be substantially the same as or subs similar to a refractive index ($N_p$) of the polymer network 115. That is, incident light may pass through the liquid crystal structure 125 without scattering, so that the liquid crystal display device may operate in a transmissive mode.

As illustrated in FIG. 4, when the electric field is generated between the first and the second electrodes 105 and 135 by applying a voltage to the first electrode 105 and/or the second electrode 135, the liquid crystal molecules 120 may be tilted by the electric field. Hence, an effective refractive index of each liquid crystal molecule may be different from the refractive index ($N_p$) of the polymer network 115. That is, the effective refractive index of each liquid crystal molecule 120, which is the sum of the refractive index ($N_e$) in the Z axis and the refractive index ($N_o$) in the X and the Y axes, may be different from the refractive index ($N_p$) of the polymer network 115. Since the incident light may be reflected and scattered by the liquid crystal molecules 120 in the liquid crystal structure 125, the liquid crystal display device may be operated in a scattering mode.

Figure 5:
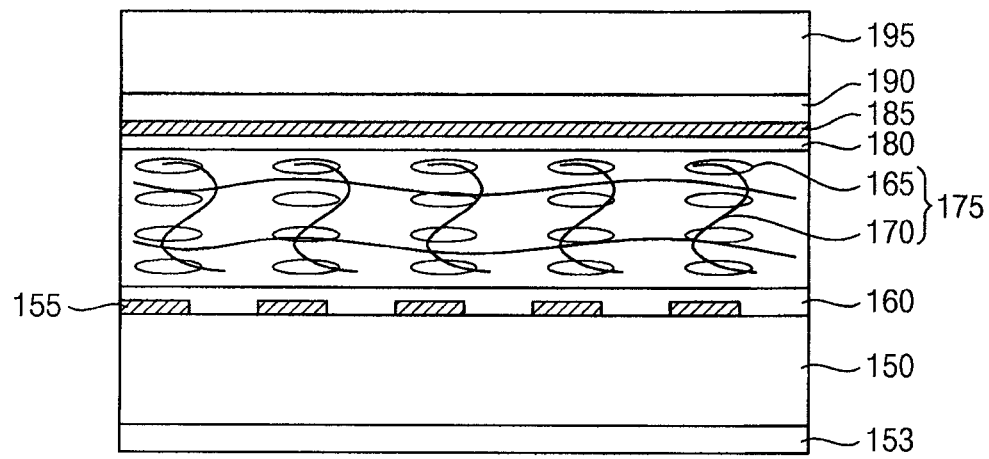
FIG. 5 is a cross-sectional view of a liquid crystal display device operating in a transmissive mode according to some example embodiments.
Figure 6:
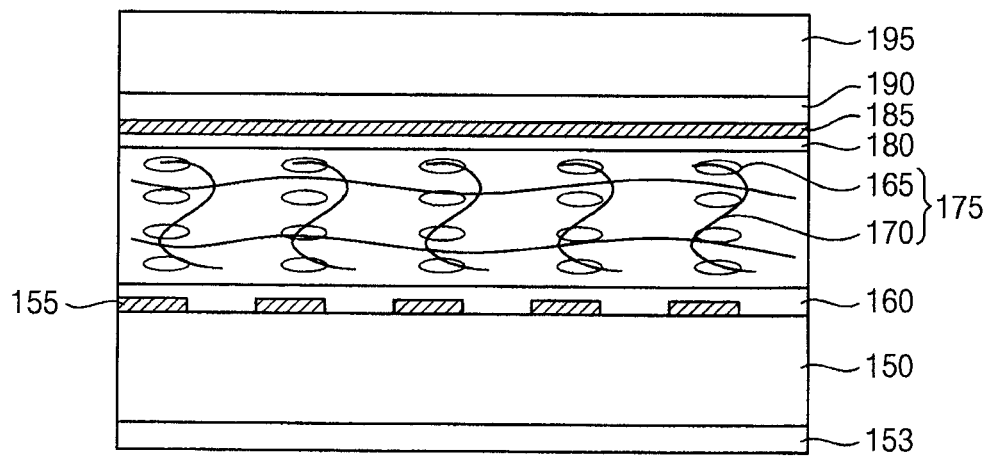
FIG. 6 is a cross-sectional view of a liquid crystal display device operating in a scattering mode according to some example embodiments.

FIG. 5 is a cross-sectional view illustrating a liquid crystal display device operating in a transmissive mode according to some example embodiments. FIG. 6 is a cross-sectional view illustrating a liquid crystal display device operating in a scattering mode according to some example embodiments. The liquid crystal display device illustrated in FIGS. 5 and 6 may have a configuration substantially the same as or substantially similar to that of the liquid crystal display device described with reference to FIGS. 1 and 2 except for the inclusion of a polarization layer 153 and the first electrode 155.

Referring to FIGS. 5 and 6, the liquid crystal display device may include a first substrate 150, a polarization layer 153, a first electrode 155, a first alignment layer 160, a liquid crystal structure 175 having a polymer network 170 and liquid crystal molecules 165, a second alignment layer 180, a second electrode 185, a color filter 190, a second substrate 195, and the like.

Each of the first and the second substrates 150 and 195 may include a transparent insulation substrate. A lower structure (not illustrated) having a switching device and a driving circuit may be disposed on a first face (e.g., an upper face) of the first substrate 150, and more than one insulation layer (not illustrated) covering the lower structure may be provided on the first face of the first substrate 150.

The first electrode 155 may be located on the first face of the first substrate 150. In example embodiments, the first electrode 155 of each pixel may be divided into a plurality of parts arranged on the first face of the first substrate 150 substantially parallel to one another. For example, the first electrode 155 including the plurality of parts may be disposed in one pixel region. In this case, each of the parts of the first electrode 155 may have a slit shape, a line shape, a bar shape, and/or the like. Because one second electrode 185 may be disposed in one pixel region, an electric field may be generated between the parts of the first electrode 155 and the second electrode 185 along a direction substantially perpendicular to the first substrate 150 and/or the second substrate 195. Furthermore, an electric field may be generated between adjacent parts of the first electrode 155 along a direction substantially parallel to the first substrate 150 and/or the second substrate 195. Therefore, the liquid crystal molecules 165 of the liquid crystal structure 175 may be switched between adjacent parts of the first electrode 155. This configuration of the liquid crystal molecules 165 between the first electrode 155 and the second electrode 185 may be referred to as an in-plane switching (IPS) mode. The first electrode 155 having the plurality of parts may be formed by processes substantially similar to the processes of forming the first electrode 15 described with reference to FIGS. 1 and 2 except for patterning a conductive layer into the plurality of parts disposed substantially parallel to one another.

In example embodiments, the polarization layer 153 may be disposed on a second face (e.g., a bottom face) of the first substrate 150. The polarization layer 153 may have a transmissive axis substantially parallel to a direction where the parts of the first electrode 155 extend. Hence, the polarization layer 153 may pass a component of incident light propagating in a direction substantially parallel to the parts of the first electrode 155 after the light generated from a light source (not illustrated) is incident into the polarization layer 153. In some example embodiments, a transparent adhesion layer (not illustrated) may be disposed between the polarization layer 153 and the second face of the first substrate 150. The transparent adhesion layer may improve adhesion strength between the polarization layer 153 and the first substrate 150.

The first alignment layer 160 may be disposed on the first face of the first substrate 150 to cover the parts of the first electrode 155. The first alignment layer 160 may be subject to a rubbing treatment in case that a voltage is not applied to the first electrode 155 and/or the second electrode 185. Hence, the liquid crystal molecules 165 may be oriented in a direction substantially parallel to the first substrate 150.

The liquid crystal structure 175 having a plurality of liquid crystal molecules 165 and the polymer network 170 may be positioned on the first alignment layer 160. In example embodiments, the liquid crystal molecules 165 may include vertical alignment type liquid crystal molecules. In this case, the first alignment layer 160 may be treated by the rubbing process as described above, so that major axes of the liquid crystal molecules 165 may be arranged along a direction substantially parallel to the first substrate 150 when an electric field is not generated between the first and the second electrodes 155 and 185.

The color filter 190 may be disposed on the first face of the second substrate 195 substantially opposed to the first face of the first substrate 150. The second electrode 185 may be located on the color filter 190. Although the first electrode 155 may include the parts arranged substantially parallel to one another, the second electrode 185 may be a common electrode shared by adjacent pixels.

The second alignment layer 180 may be disposed on the second electrode 185. Similar to the first alignment layer 160, a rubbing process may also be performed on the second alignment layer 180, such that the liquid crystal molecules 165 may be oriented in a direction substantially parallel to the second substrate 195 when a voltage is not applied to the first electrode 155 and/or the second electrode 185.

In the liquid crystal display device according to example embodiments, one polarization layer 153 may be disposed beneath the first substrate 150. For example, the polarization layer 153 may be positioned on a bottom face (e.g., the second face) of the first substrate 150. When the minor axes of the liquid crystal molecules 165 are oriented along a direction substantially parallel to the transmissive axis of the polarization layer 153 (due to the rubbing processes), incident light may progress through the liquid crystal structure 175 along the direction substantially parallel to the minor axes of the liquid crystal molecules 165. Thus, the incident light may pass through the liquid crystal structure 175 without scattering or reflecting because the refraction index ($N_o$) of each liquid crystal molecule 165 in the minor axis may be substantially the same as the refraction index ($N_p$) of the polymer network 170. Namely, as illustrated in FIG. 5, the liquid crystal display device may operate in a transmissive mode when an electric field is not generated between the first and the second electrodes 155 and 185.

Meanwhile, as illustrated in FIG. 6, when a substantially vertical electric field and a substantially horizontal electric field are generated among the second electrode 185 and the parts of the first electrode 155, the liquid crystal molecules 165 may revolve horizontally from the transmissive axis of the polarization layer 153 by predetermined or set angles. That is, each of the liquid crystal molecules 165 in FIG. 6 may have a width substantially smaller than that of each of liquid crystal molecules 165 in FIG. 5 because of the horizontal rotation of each liquid crystal molecule 165 relative to the transmissive axis of the polarization layer 153. Therefore, the liquid crystal display device may operate in a scattering mode because the light passing through the polarization layer 153 may be reflected or scattered by difference between effective refraction indexes of the liquid crystal molecules 165 and the refraction index ($N_p$) of the polymer network 170.

Figure 7:
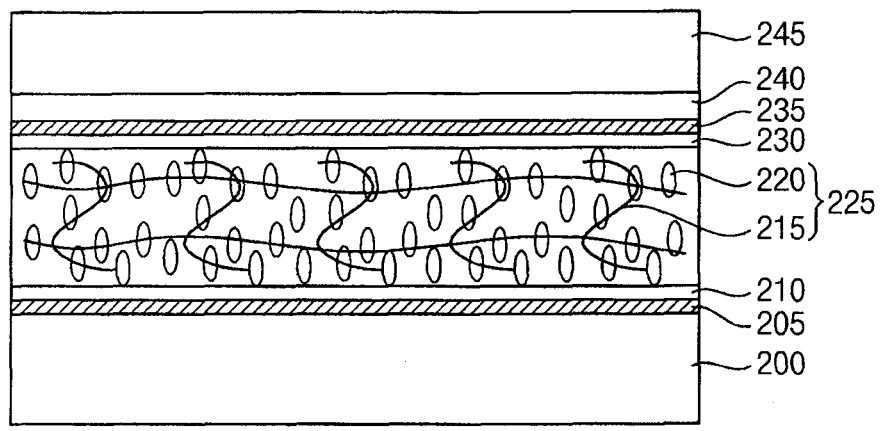
FIG. 7 is a cross-sectional view of a liquid crystal display device operating in a transmissive mode according to some example embodiments.
Figure 8:
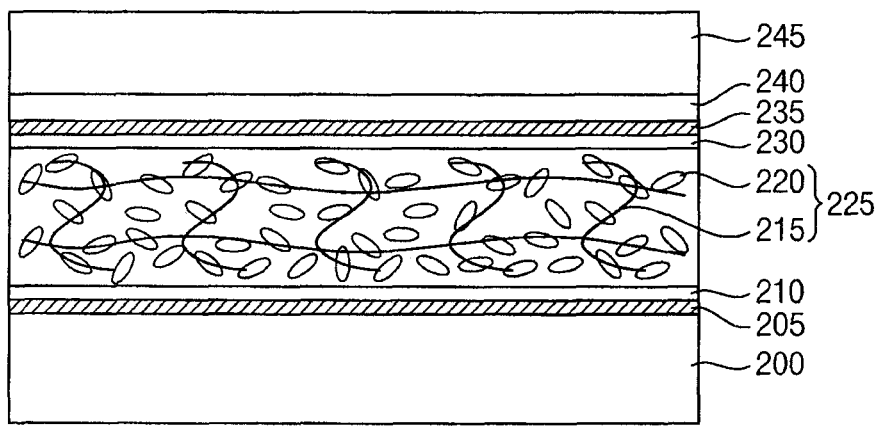
FIG. 8 is a cross-sectional view of a liquid crystal display device operating in a scattering mode according to some example embodiments.

FIG. 7 is a cross-sectional view illustrating a liquid crystal display device operating in a transmissive mode according to some example embodiments. FIG. 8 is a cross-sectional view illustrating a liquid crystal display device operating in a scattering mode according to some example embodiments. The liquid crystal display device illustrated in FIGS. 7 and 8 may have a configuration substantially the same as or substantially similar to that of the liquid crystal display device described with reference to FIGS. 1 and 2 except for a first alignment layer 210 and a second alignment layer 230.

Referring to FIGS. 7 and 8, the liquid crystal display device may include a first substrate 200, a first electrode 205, a first alignment layer 210, a liquid crystal structure 225 having a polymer network 215 and a plurality of liquid crystal molecules 220, a second alignment layer 230, a second electrode 235, a color filter 240, a second substrate 245, and the like.

In example embodiments, each of the first and the second alignment layers 210 and 230 may be subject to a rubbing process, such that major axes of the liquid crystal molecules 220 may be arranged along a direction substantially perpendicular to the first substrate 200 and/or the second substrate 245. Therefore, when a voltage is not applied to the first electrode 205 and/or the second electrode 235, the liquid crystal molecules 220 are arranged in a direction substantially perpendicular to the first substrate 200 and/or the second substrate 245. In accordance with the rubbing treatment of the first and the second alignment layers 210 and 230, a refraction index ($N_o$) of each liquid crystal molecule 220 in a minor axis may be substantially the same as a refraction index ($N_p$) of the polymer network 215, so the liquid crystal display device may operate in a transmissive mode when an electric field is not generated between the first electrode 205 and the second electrode 235 as illustrated in FIG. 7.

When an electric field is formed between the first and the second electrodes 205 and 235, an effective refraction index of each liquid crystal molecule 220 in the major and the minor axes may be substantially different from the refraction index ($N_p$) of the polymer network 215, so the liquid crystal display device may operate in a scattering mode as illustrated in FIG. 8.

Figure 9:
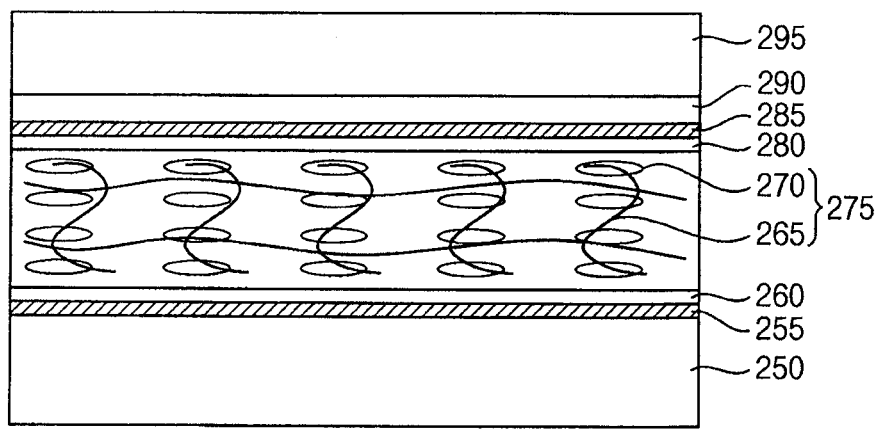
FIG. 9 is a cross-sectional view of a liquid crystal display device operating in a transmissive mode according to some example embodiments.
Figure 10:
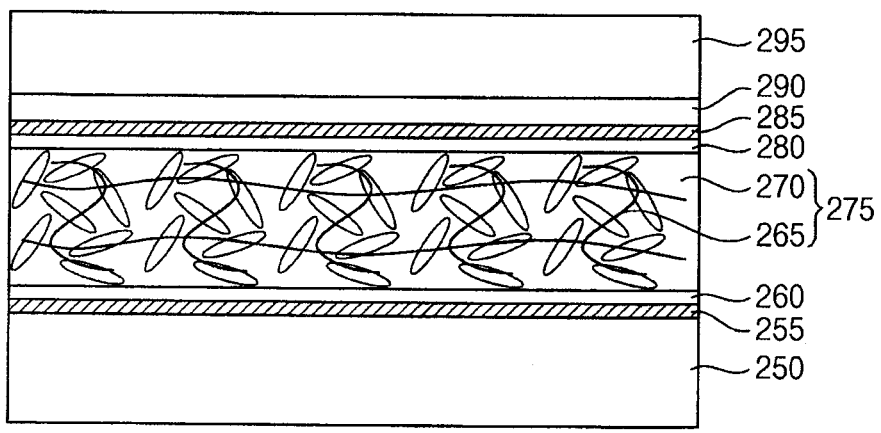
FIG. 10 is a cross-sectional view of a liquid crystal display device operating in a scattering mode according to some example embodiments.

FIG. 9 is a cross-sectional view illustrating a liquid crystal display device operating in a transmissive mode according to some example embodiments. FIG. 10 is a cross-sectional view illustrating a liquid crystal display device operating in a scattering mode according to some example embodiments. The liquid crystal display device illustrated in FIGS. 9 and 10 may have a configuration substantially the same as or substantially similar to that of the liquid crystal display device described with reference to FIGS. 1 and 2 except a first alignment layer 260 and a second alignment layer 280.

Referring to FIGS. 9 and 10, the liquid crystal display device may include a first substrate 250, a first electrode 255, a first alignment layer 260, a liquid crystal structure 275 having a polymer network 265 and a plurality of liquid crystal molecules 270, a second alignment layer 280, a second electrode 285, a color filter 280, a second substrate 295, and the like.

In example embodiments, each of the first and the second alignment layers 260 and 280 may be subject to rubbing processes, respectively. Thus, a minor axis of each liquid crystal molecule 270 may be arranged along a direction substantially perpendicular to the first substrate 250 and/or the second substrate 295 when a voltage is not applied to the first electrode 255 and/or the second electrode 285. That is, a major axis of each liquid crystal molecule 270 may be substantially parallel to the first substrate 250 and/or the second substrate 295 by the rubbing process for the first and the second alignment layers 260 and 280.

The rubbing treatment of the first and the second alignment layers 260 and 280 may provide that a refraction index ($N_o$) of each liquid crystal molecule 270 in the minor axis may be substantially the same as a refraction index ($N_p$) of the polymer network 265. Hence, as illustrated in FIG. 9, the liquid crystal display device may operate in a transmissive mode when an electric field is not generated between the first and the second electrodes 255 and 285. However, the liquid crystal display device may have slightly lowered transparency in the transmissive mode because the refraction index ($N_o$) of each liquid crystal molecule 270 in the minor axis may be slightly different from the refraction index ($N_p$) of the polymer network 265. That is, initial scattering phenomena of incident light may occur in the liquid crystal structure 275 to thereby slightly reduce the initial transparency of the liquid crystal display device.

When a voltage is applied to the first electrode 255 and/or the second electrode 285, an effective refraction index of each liquid crystal molecule 270 in the major and the minor axes may be substantially different from the refraction index ($N_p$) of the polymer network 265. Therefore, the liquid crystal display device may operate in a scattering mode when an electric field is generated between the first and the second electrodes 255 and 285 as illustrated in FIG. 10.

Figure 11:
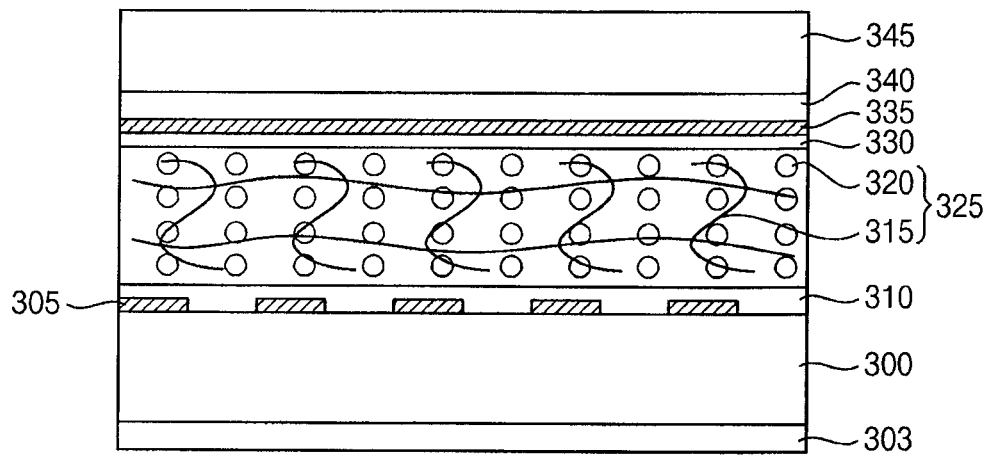
FIG. 11 is a cross-sectional view of a liquid crystal display device operating in a transmissive mode according to some example embodiments.
Figure 12:
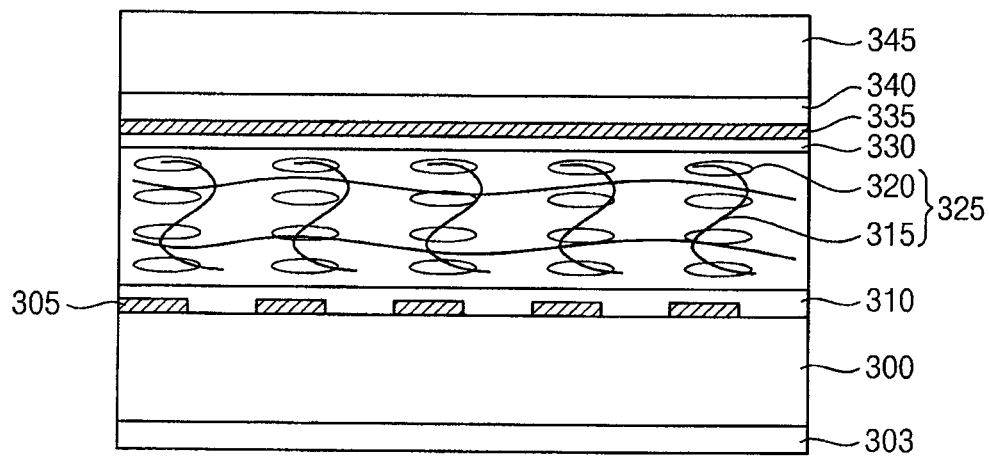
FIG. 12 is a cross-sectional view of a liquid crystal display device operating in a scattering mode according to some example embodiments.

FIG. 11 is a cross-sectional view illustrating a liquid crystal display device operating in a transmissive mode according to some example embodiments. FIG. 12 is a cross-sectional view illustrating a liquid crystal display device operating in a scattering mode according to some example embodiments. The liquid crystal display device illustrated in FIGS. 11 and 12 may have a configuration substantially the same as or substantially similar to that of the liquid crystal display device described with reference to FIGS. 1 and 2 except a polarization layer 303 and a first electrode 305.

Referring to FIGS. 11 and 12, the liquid crystal display device may include a first substrate 300, a polarization layer 303, a first electrode 305, a first alignment layer 310, a liquid crystal structure 325 having a polymer network 315 and a plurality of liquid crystal molecules 320, a second alignment layer 330, a second electrode 335, a color filter 340, a second substrate 345, and the like.

A lower structure (not illustrated) may be provided on a first face (e.g., an upper face) of the first substrate 300, and at least one insulation layer (not illustrated) may be disposed on the first face of the first substrate 300 to cover the lower structure. The first electrode 305 may be disposed on the first face of the first substrate 300. In example embodiments, each first electrode 305 of pixels may be divided into a plurality of portions arranged in a direction substantially parallel to one another. Because one second electrode 335 serving as a common electrode may correspond to the first electrode 305 having the plurality of parts, an electric field may be generated between the first electrode 305 and the second electrode 335 along a direction substantially perpendicular to the first substrate 300 and/or the second substrate 345. However, an electric field may be formed between adjacent parts of the first electrode 305 along a direction substantially parallel to the first substrate 300 and/or the second substrate 345. Therefore, the liquid crystal molecules 320 of the liquid crystal structure 325 may be switched among the parts of the first electrode 305.

In example embodiments, the liquid crystal molecules 320 may include electrically controlled birefringence (EBC) type liquid crystal molecules. For example, refraction indexes of the liquid crystal molecules 320 may be controlled by applying an electric field to the liquid crystal molecules 320. Further, the polarization layer 303 may be disposed on a second face (e.g., a bottom face) of the first substrate 300. The polarization layer 303 may have a transmissive axis substantially perpendicular to a direction where the parts of the first electrode 305 extend. For example, the polarization layer 303 may pass a component of incident propagating along a direction substantially perpendicular to the direction in which the parts of the first electrode 305 extend. In this case, each liquid crystal molecule 320 may have a major axis substantially perpendicular to the transmissive axis of the polarization layer 303. That is, the major axis of each liquid crystal molecule 320 may be substantially parallel to the direction where the parts of the first electrode 305 extend.

The first alignment layer 310 may be disposed on the first face of the first substrate 300 to cover the first electrode 305. The first alignment layer 310 may be subject to a rubbing process so that the liquid crystal molecules 320 may be oriented in a direction substantially parallel to a transmissive axis of the polarization layer 303 when an electric field is not generated between the first electrode 305 and the second electrode 335.

The color filter 340 may be located on a first face of the second substrate 345 substantially facing with the first face of the first substantially 300. The second electrode 335 may be disposed on the color filter 340. The first electrode 305 having the plurality of parts may be disposed in each pixel, whereas one second electrode 335 serving as the common electrode may be shared by adjacent pixels.

The second alignment layer 330 may be disposed on the second electrode 335. Similar to the first alignment layer 310, a rubbing process may also be performed on the second alignment layer 330, so that minor axes of the liquid crystal molecules 320 may be oriented in a direction substantially parallel to the transmissive axis of the polarization layer 303 when a voltage is not applied to the first electrode 305 and/or the second electrode 335.

In the liquid crystal display device according to example embodiments, the polarization layer 303 may be located beneath the first substrate 300, and the liquid crystal structure 325 may include the liquid crystal molecules 320 having the refractive indexes adjusted by the applied voltage. In case that the minor axes of the liquid crystal molecules 320 are substantially parallel to the transmissive axis of the polarization layer 303 by the first and the second alignment layers 310 and 330, incident light may progress in the liquid crystal structure 325 along the direction substantially parallel to the minor axes of the liquid crystal molecules 320. Hence, the incident light may pass through the liquid crystal structure 325 without scattering or reflecting because the refraction index ($N_o$) of each liquid crystal molecule 320 in the minor axis may be substantially the same as the refraction index ($N_p$) of the polymer network 315. Therefore, as illustrated in FIG. 11, the liquid crystal display device may operate in a transmissive mode when an electric field is not generated between the first and the second electrodes 305 and 335.

On the other hand, as illustrated in FIG. 12, when a substantially vertical electric field and a substantially horizontal electric field are generated among the second electrode 335 and the parts of the first electrode 305, the liquid crystal molecules 320 may revolve horizontally from the transmissive axis of the polarization layer 303 by predetermined angles, respectively. Namely, each of the liquid crystal molecules 320 in FIG. 12 may have a width substantially greater than that of each of liquid crystal molecules 320 in FIG. 11 because of the horizontal rotation of each liquid crystal molecule 320 with respect to the transmissive axis of the polarization layer 303. Thus, the light passing through the polarization layer 303 may be reflected or scattered by difference between effective refraction indexes of the liquid crystal molecules 320 and the refraction index ($N_p$) of the polymer network 315. As a result, the liquid crystal display device may operate in a scattering mode.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the disclosure. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims and equivalents thereof.

What is claimed is:

1. A liquid crystal display device comprising:
   a first substrate;
   a first electrode on the first substrate;
   a second substrate facing the first substrate;
   a second electrode on the second substrate facing the first electrode; and
   a liquid crystal structure between the first electrode and the second electrode, the liquid crystal structure comprising a polymer network and liquid crystal molecules,
   wherein the liquid crystal display device operates in a transmissive mode when an electric field is not generated between the first and the second electrodes, and the liquid crystal display device operates in a scattering mode when an electric field is generated between the first and the second electrodes,
   wherein the liquid crystal display device is transparent or substantially transparent when the liquid crystal display device operates in the transmissive mode, and
   wherein a refractive index of each liquid crystal molecule in a minor axis is the same as a refractive index of the polymer network when the liquid crystal display device operates in the transmissive mode.

2. The liquid crystal display device of claim 1, wherein the liquid crystal molecules are partially or entirely dispersed in the polymer network.

3. The liquid crystal display device of claim 2, wherein the polymer network is present in a range of about 5 wt% to about 50 wt% based on a total weight of the liquid crystal structure.

4. The liquid crystal display device of claim 1, further comprising:
   a first alignment layer on the first electrode; and
   a second alignment layer on the second electrode.

5. The liquid crystal display device of claim 4, further comprising a color filter between the second substrate and the second electrode.

6. The liquid crystal display device of claim 4, wherein the liquid crystal structure includes a color dye.

7. The liquid crystal display device of claim 4, wherein each of the first and the second alignment layers is not subjected to a rubbing process.

8. A liquid crystal display device comprising:
a first substrate;
a first electrode on the first substrate;
a second substrate facing the first substrate;
a second electrode on the second substrate facing the first electrode; and
a liquid crystal structure between the first electrode and the second electrode, the liquid crystal structure comprising a polymer network and liquid crystal molecules,
wherein the liquid crystal display device operates in a transmissive mode when an electric field is not generated between the first and the second electrodes, and the liquid crystal display device operates in a scattering mode when an electric field is generated between the first and the second electrodes,
wherein the liquid crystal display device is transparent or substantially transparent when the liquid crystal display device operates in the transmissive mode,
wherein each of first and second alignment layers is not subjected to a rubbing process,
wherein an effective refractive index of each liquid crystal molecule in a minor axis and a major axis is greater than a refractive index of the polymer network when the liquid crystal display device operates in the scattering mode.

9. The liquid crystal display device of claim 4, wherein each of the first and the second alignment layers is subject to a rubbing process to align the liquid crystal molecules in a direction parallel to the first substrate or the second substrate when the liquid crystal display device operates in the transmissive mode.

10. A liquid crystal display device comprising:
a first substrate;
a first electrode on the first substrate;
a second substrate facing the first substrate;
a second electrode on the second substrate facing the first electrode; and
a liquid crystal structure between the first electrode and the second electrode, the liquid crystal structure comprising a polymer network and liquid crystal molecules,
wherein the liquid crystal display device operates in a transmissive mode when an electric field is not generated between the first and the second electrodes, and the liquid crystal display device operates in a scattering mode when an electric field is generated between the first and the second electrodes,
wherein the liquid crystal display device is transparent or substantially transparent when the liquid crystal display device operates in the transmissive mode,
wherein each of first and second alignment layers is subject to a rubbing process to align the liquid crystal molecules in a direction parallel to the first substrate or the second substrate when the liquid crystal display device operates in the transmissive mode, and
wherein refractive indexes of each liquid crystal molecule in an X direction and a Y direction are the same as a refractive index of the polymer network when the liquid crystal display device operates in the transmissive mode.

11. A liquid crystal display device comprising:
a first substrate;
a first electrode on the first substrate;
a second substrate facing the first substrate;
a second electrode on the second substrate facing the first electrode; and
a liquid crystal structure between the first electrode and the second electrode, the liquid crystal structure comprising a polymer network and liquid crystal molecules,
wherein the liquid crystal display device operates in a transmissive mode when an electric field is not generated between the first and the second electrodes, and the liquid crystal display device operates in a scattering mode when an electric field is generated between the first and the second electrodes,
wherein the liquid crystal display device is transparent or substantially transparent when the liquid crystal display device operates in the transmissive mode,
wherein each of first and second alignment layers is subject to a rubbing process to align the liquid crystal molecules in a direction parallel to the first substrate or the second substrate when the liquid crystal display device operates in the transmissive mode, and
wherein an effective refractive index of each liquid crystal molecule in an X direction, a Y direction, and a Z direction is different from a refractive index of the polymer network when the liquid crystal display device operates in the scattering mode.

12. The liquid crystal display device of claim 4, wherein each of the first and the second alignment layers is subject to a rubbing process to align the liquid crystal molecules in a direction perpendicular to the first substrate or the second substrate when the liquid crystal display device operates in the transmissive mode.

13. The liquid crystal display device of claim 4, further comprising a polarization layer on a bottom of the first substrate, wherein the first electrode comprises a plurality of portions arranged parallel to one another.

14. The liquid crystal display device of claim 13, wherein each of the first and the second alignment layers is subject to a rubbing process to align the liquid crystal molecules in a direction parallel to the first substrate or the second substrate when the liquid crystal display device operates in the transmissive mode.

15. The liquid crystal display device of claim 1, wherein a transmissive axis of a polarization layer is parallel to the minor axis of each liquid crystal molecule.

16. The liquid crystal display device of claim 1, wherein a transmissive axis of a polarization layer is parallel to a major axis of each liquid crystal molecule, and wherein an effective refractive index of each liquid crystal molecule in the major axis and a minor axis is different from a refractive index of the polymer network when the liquid crystal display device operates in the scattering mode.

\* \* \* \* \*